US008027376B2

(12) United States Patent
Yamanaka et al.

(10) Patent No.: US 8,027,376 B2
(45) Date of Patent: Sep. 27, 2011

(54) METHOD AND SYSTEM FOR MEASURING IQ PATH MISMATCH

(75) Inventors: Akira Yamanaka, Union City, CA (US); Iason Vassiliou, Berkeley, CA (US)

(73) Assignee: Broadcom Corporation

( * ) Notice: Subject to any disclaimer, the term of this patent is extended or adjusted under 35 U.S.C. 154(b) by 2376 days.

(21) Appl. No.: 10/773,804

(22) Filed: Feb. 6, 2004

(65) Prior Publication Data

US 2004/0217753 A1    Nov. 4, 2004

Related U.S. Application Data

(60) Provisional application No. 60/445,563, filed on Feb. 7, 2003.

(51) Int. Cl.
*H04B 1/38* (2006.01)
(52) U.S. Cl. .......................... 375/219; 375/224
(58) Field of Classification Search .................. 375/219, 375/220, 222, 224, 358, 356, 221
See application file for complete search history.

(56) References Cited

U.S. PATENT DOCUMENTS

| | | | |
|---|---|---|---|
| 7,155,180 B2* | 12/2006 | Kim et al. ................. | 455/114.2 |
| 2003/0206603 A1* | 11/2003 | Husted .......................... | 375/324 |
| 2004/0002323 A1* | 1/2004 | Zheng .......................... | 455/324 |
| 2004/0038649 A1* | 2/2004 | Lin et al. ...................... | 455/130 |
| 2004/0203472 A1* | 10/2004 | Chien ........................... | 455/68 |
| 2004/0219892 A1* | 11/2004 | Vaidyanathan et al. ...... | 455/103 |
| 2006/0262872 A1* | 11/2006 | Green et al. .................. | 375/260 |

* cited by examiner

*Primary Examiner* — Emmanuel Bayard
(74) *Attorney, Agent, or Firm* — McAndrews, Held & Malloy, Ltd.

(57) ABSTRACT

Aspects for measuring IQ path mismatch in signal modulation are described. The aspects include estimating a transmitter IQ mismatch in a form of gain and phase response for transmitter I and Q paths sharing a receiver path, and estimating a receiver IQ mismatch in a form of gain and phase response for receiver I and Q paths sharing a signal source. Further included is compensating for the difference of the transmitter and receiver I and Q paths using a digital FIR filter. Iterative estimation is utilized for filter tap parameters during the compensating.

20 Claims, 2 Drawing Sheets

METHOD AND SYSTEM FOR MEASURING IQ PATH MISMATCH

CROSS REFERENCE TO RELATED APPLICATIONS

The present application claims the benefit of U.S. Provisional Patent Application No. 60/445,563, filed Feb. 7, 2003, entitled "IQ path mismatch digital calibration," which is incorporated herein by reference in its entirety.

FIELD OF THE INVENTION

The present invention relates to transceivers, and more particularly to estimation and digital compensation of IQ path mismatch in transceivers.

BACKGROUND OF THE INVENTION

One increasingly popular application for wireless systems are wireless local area networks (WLANs) of computer systems. Prominent in the field of home and business, wireless computer networks include the wireless standards known as 802.11. The first standard to be available in commercial products was 802.11b. However, increasing demand for higher capacity in the growing wireless LAN market has led to the introduction of a new generation of WLAN standards using more spectrally efficient modulation techniques, including the IEEE 802.11a standard. The 802.11a standard operates in the 5 GHz unlicensed national information infrastructure (UNII) band (5.15-5.35 GHz, 5.725-5.825 GHz) and is based on orthogonal frequency division multiplexing (OFDM). It supports data rates from 6 Mb/s to 54 Mb/s compared to 1 Mb/s to 11 Mb/s offered by 802.11b. The 802.11a operation around 5 GHz offers the additional advantage of less interference compared to the 2.4 GHz ISM band, where in addition to 802.11b, other band users include microwave ovens, cordless phones, Bluetooth systems, and vintage 802.11 systems.

The advantages of 802.11a come at a cost, however, as OFDM-based systems pose significant implementation challenges requiring low in-band phase noise, high linearity, accurate quadrature matching, closely matched frequency response between the I and Q signal paths, and a large dynamic range. "I" and "Q" are terms referring to "in-phase" and "quadrature," respectively. Ideally, the difference between I and Q signal paths in a transceiver is 90 degrees and the gain is 0 dB. I/Q mismatch refers to the difference in phase and gain between these paths. For example, in order to meet the transmitter error vector magnitude (EVM) specification for the 54 Mb/s mode with a 3 dB implementation margin, system simulation shows that an I/Q mismatch of 1.5o/0.2 dB, an integrated phase noise error of 1o rms and operation at 8 dB backoff from the transmitter 1 dB compression point are required.

In addition to tight performance constraints, pricing pressures require that wireless systems be low-cost and highly integrated implementations. To address these needs, the continuous trend towards low-cost integration of wireless systems has driven the introduction of innovative single-chip architectures in CMOS technologies as inexpensive alternatives to the traditional superheterodyne implementations operating at frequencies up to 5 GHz. Many of these single chip architectures are homodyne or direct conversion architectures, which have much fewer components than superheterodyne implementations. For example, in superheterodyne systems, the intermediate frequency (IF) must be high, so that the image is located far from the wanted signal in the frequency spectrum. However, since the IF frequency is high, the filtering of the desired channel (at IF) must also be done at the high frequency. It is difficult or impossible to implement such a filter as an integrated system, so external components are unavoidable. Direct conversion systems do not need such external components.

However, such highly-integrated direct-conversion single-chip architectures suffer from well-known shortcomings that may limit their applicability. These are problems that are also shared by other integrated architectures such as low-IF or wideband-IF, but which can be further aggravated by using CMOS technology.

For example, on the receiver side, the most common problem is the presence of DC offsets, both static and time-varying. In the 802.11a standard, even though a down-converted I/Q signal occupies bandwidth from 150 kHz to 8.3 MHz, the maximum 40 ppm frequency mismatch allowed between transmitter and receiver may shift the signal around DC, thus prohibiting AC coupling without using complex analog frequency correction techniques.

Static DC offset is the result of component mismatches in the signal path and local oscillator (LO) leakage at the inputs of the mixer and the low-noise amplifier (LNA) due to finite on-chip isolation. The leakage signal after mixing with the LO produces a DC component at the baseband input, which depends on the frequency and power of the LO signal. Since static DC offset may be large enough to saturate the baseband receive chain, it needs to be cancelled in the analog domain.

Time-varying DC offsets, in direct conversion receivers, can be the result of self-mixing due to leakage of single-tone (CW) or frequency modulated (FM) interference to the LO port. Similarly, second order distortion applied to CW or FM interference results in DC offset, which varies with the frequency and the power level of the received signal. Since strong interference is not usually present in the 802.11a operating bands, the dominant mechanism causing time-varying DC offsets is self-mixing of the LO signal leaking to the antenna and reflected back from the environment. At the 5 GHz carrier frequency, due to high attenuation and absorbency of reflected signals, such time-varying DC offsets are small compared to the static DC offsets and the overall dynamic range of the receiver (e.g., in the order of 10-50 mV for a 2Vp-p signal), thus it is well known that the time-varying offsets can be tracked and removed by digital signal processing (DSP) after analog-to-digital conversion.

Direct down/up-conversion from/to 5 GHz requires quadrature LO generation at the RF carrier frequency which may result in large I/Q mismatches (including gain and phase mismatches). Other significant problems include sensitivity to flicker noise and pulling of the voltage-controlled oscillator (VCO) by the external or on-chip power amplifier (PA). In addition to these architecture-related non-idealities, higher order QAM-OFDM modulation requires tightly matched baseband I/Q filters on both transmit and receive side to avoid degradation of the overall EVM.

For a spectrum efficient modulation such as QAM64, precise IQ path matching is required for both group delay and gain. A group delay of a few percentage of the symbol period or a gain mismatch of 1 db would have a significant impact on the overall performance of the communication system. Achieving such a high matching by analog design and manufacturing technology is not easy.

Accordingly, a need exists for an ability to measure the mismatch, with digital estimation and digital compensation that includes the matching of the entire passband characteristics of the baseband path. The present invention addresses such a need.

SUMMARY OF INVENTION

Aspects for measuring IQ path mismatch in signal modulation are described. The aspects include estimating a transmitter IQ mismatch in a form of gain and phase response for transmitter I and Q paths sharing a receiver path, and estimating a receiver IQ mismatch in a form of gain and phase response for receiver I and Q paths sharing a signal source. Further included is compensating for the difference of the transmitter and receiver I and Q paths using a digital FIR filter. Iterative estimation is utilized for filter tap parameters during the compensating.

DETAILED DESCRIPTION OF PREFERRED EMBODIMENTS

The present invention relates to transceivers, and more particularly to estimation and digital compensation of IQ path mismatch in transceivers. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown but is to be accorded the widest scope consistent with the principles and features described herein.

Embodiments and examples of the present invention are described below. While particular applications and methods are explained, it should be understood that the present invention can be used in a wide variety of other applications and with other techniques within the scope of the present invention.

Figure 1:
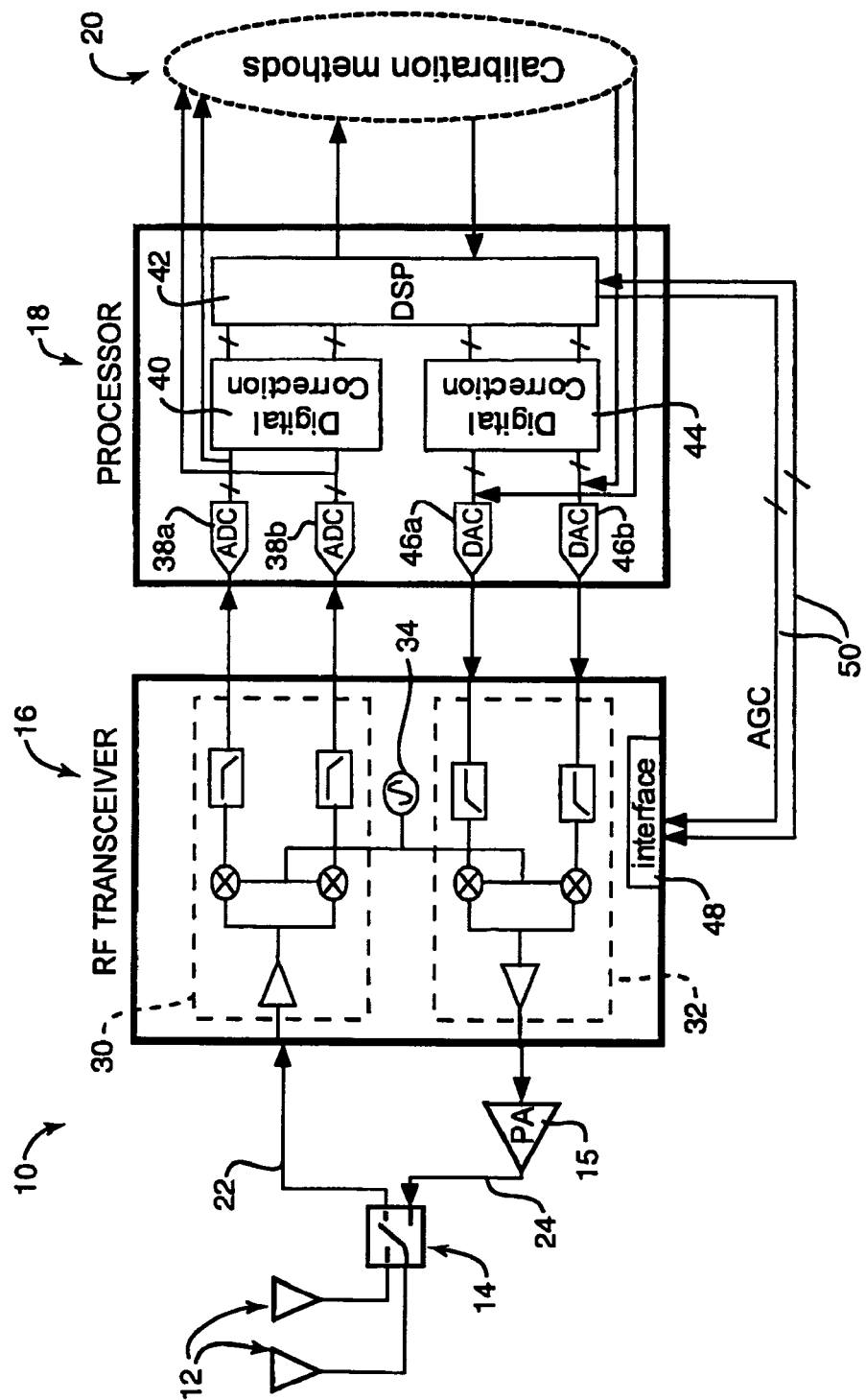
FIG. 1 is a block diagram illustrating an overall system architecture for a direct conversion transceiver and calibration processor of the present invention.

FIG. 1 is a block diagram of an overall system architecture 10 for the present invention. System 10 includes one or more antennas 12, a transfer switch 14, a radio frequency (RF) transceiver 16, a companion baseband processor 18, and calibration methods 20.

Antennas 12 are used to receive a transmitted signal from the air, and to transmit a signal to this air channel. For example, in a wireless LAN environment, a different computer may be transmitting data via wireless transmission, which is then received by one or more antennas 12. Or, the computer to which the antennas 12 are coupled can transmit a signal via antennas 12, which is received by a different antenna, computer or device. Other types of wireless devices can also use one or more antennas 12 which are also suitable for use with the present invention. A transfer switch 14 can be coupled to the antennas 12 and is used to switch between an input port 22 and an output port 24. The transfer switch 14 can be a double-pole double-throw (DPDT) switch, or a combination of switches or switches and diodes performing the same functionality. Typically, the received signal is filtered by one or more radio frequency (RF) filters (not shown) before being provided at the receiver input 12.

The input 22 and output 24 are connected to RF transceiver 16 of the present invention, which includes a receiver component 30, a transmitter component 32, and a frequency synthesizer 34. The receiver component 30 receives the signals from the antennas 12 and processes the signals to allow the desired data to be retrieved from the signals. Processing includes frequency translation to a low intermediate frequency (IF) or baseband, and filtering of unwanted interference from the useful signal. The transmitter component 32 converts a signal formulated by the baseband processor 18 (or other processor) to a form in which it can be transmitted by the antennas 12. Frequency synthesizer 34 generates the reference frequency (LO) signals needed for modulation and demodulation in the transceiver 16. In one described embodiment, transceiver 16 is provided on a single integrated circuit chip, an integrated solution allowing it to be cheaply manufactured. RF transceiver 16 is described below in greater detail with respect to FIG. 2.

In one application for the present invention, transceiver 16 can be implemented as a direct conversion radio transceiver. This embodiment can implement the radio part of the PHY (physical) layer for an 802.11a WLAN system, for example, or other wireless LAN or communication system. For example, CMOS can be used for a single-chip implementation. Many of the problems that typically apply to integrated CMOS or other similar integrated technology in direct conversion high frequency transceiver applications are minimized in the present invention through the use of calibration techniques and overall system design.

Baseband processor 18 is coupled to RF transceiver 16. Processor 18 can be any type of processor, including a microprocessor, application-specific integrated circuit (ASIC), or other type of controller. Processor 18 can be a general purpose processor that performs other tasks and functions for the device in which the system 20 is included in addition to the functions needed for the present invention. For example, processor 18 can be a controller or processor in a wireless network card, or a general microprocessor in a computer that includes a wireless network card using the present invention. Alternatively, processor 18 can be specifically provided for the present invention, and in some embodiments can be included with transceiver 16, e.g. on the same integrated circuit chip.

An important function of the processor 18 for the present invention is the compensation of non-idealities of the transceiver 16 using computing resources of the processor 18 and by calibrating components of the transceiver. The baseband processor 18 receives a down-converted signal from the receiver component 30 of the transceiver 16, where the signal has been separated into its in-phase (I) and quadrature (Q) forms. The received signal is provided to analog-to-digital converters (ADCs) 38a and 38b, where ADC 38a receives the I signal and ADC 38b receives the Q signal.

The digital outputs of the ADCs 38a and 38b are provided to a digital correction block 40. The digital correction block 40 provides the I and Q data to a digital signal processor (DSP) 42, which performs the rest of the functionality of the PHY and MAC (media access control) communication layers (e.g., communicating with other processors and/or functions of a host computer or device. This functionality can be implemented entirely within the DSP processor 42, be partitioned between a processor (such as an ASIC) and a general processor, or reside totally in a general (e.g., host) processor. The DSP 42 can be a processor on the processor chip 18, or some other processor used to implement the calibration methods described herein. In receive mode, DSP 42 receives corrected digital data from the digital correction block 40, representing signals received by the transceiver 16, for digital demodulation for recovery of the original bits of information.

In transmit mode, when the DSP 42 has data to be transmitted, the data is corrected in correction block 44. Correction block 44 sends the I data to digital-to-analog controller (DAC) 46a and sends the Q data to DAC 46b. DACs 46a-b convert the digital data into I and Q analog signals which are provided to the transmitter 32 of transceiver 16. In one embodiment, DACs 46a-b can be dual 10-bit 40 MHz DACs, but may be any suitable type in other embodiments.

DSP 42 also provides programming signals 50 for the RF transceiver 16, which can include (but are not limited to) real time automatic gain control (AGC) signals, and signals for programming the frequency synthesizer 34, programming the correction DC offset for the DC offset correction DACs of the receiver, programming the cutoff for the analog filters, and programming the chip into different states or calibration modes as described below. In the described embodiment, a digital interface 48 of the transceiver 16 receives these signals which can include, for example, a 7-bit AGC control line and a 3-wire interface for all other programming as well as real-time signals for receiver and transmitter switching.

The programming signals 50 allow the processor 18 to control loop-back paths on the transceiver 16 so that the processor can send calibration signals (stimuli) to the transceiver and to receive responsive signals from the transceiver based on the calibration signals, i.e., as if the transceiver has received the calibration signals wirelessly. This enables the measurement of analog imperfections of the transceiver 16 during the calibration cycle and allows the processor 18 to make adjustments, also using the programming signals 50, to components in the transceiver to minimize or compensate for problems, such as I/Q mismatches, baseband filter cutoff frequency mismatch, DC offset, etc. The programming signals 50 can control the calibration paths needed for DC offset calibration, filter tuning, I/Q mismatch calibration, and LO leakage calibration, and can also be used for tuning of the frequency synthesizer 34. For example, processor 18 preferably has the capability of real-time digital pre-distortion and post-distortion in blocks 44 and 40, respectively, which is needed for compensation of transmitter and receiver I/Q mismatch and transmitter local oscillator (LO) leakage.

Baseband processor 18 can be implemented in a variety of different embodiments. The functions of processor 18 shown in FIG. 1 are common in many types of microprocessors and other types of processors, or can exist in specialized processors (e.g., ASICs), such as for wireless LAN applications in such an embodiment.

Measuring characteristics of transceiver components and computing the necessary correction parameters to correct any analog imperfections in the circuits can be implemented by the processor 18 in some embodiments (such as by DSP 42), for example as program instructions or code (software or firmware) stored in memory or other storage device (magnetic disk, CD-ROM, etc.), or by hardware (logic gates, etc.), or by a combination of hardware and software. In other embodiments, the methods can be implemented and performed by a general purpose processor, such as the host processor of a computer that includes a network card or component holding the system 20, or by a different processor in communication with the processor 18 or transceiver 16.

The present invention thus corrects for nonidealities in the analog front-end of a transceiver by using overall system resources and achieves performance adequate to support high bit rate modulation schemes. In some embodiments, aspects of the present invention can also be used in non-direct-conversion transceivers, as appropriate.

Figure 2:
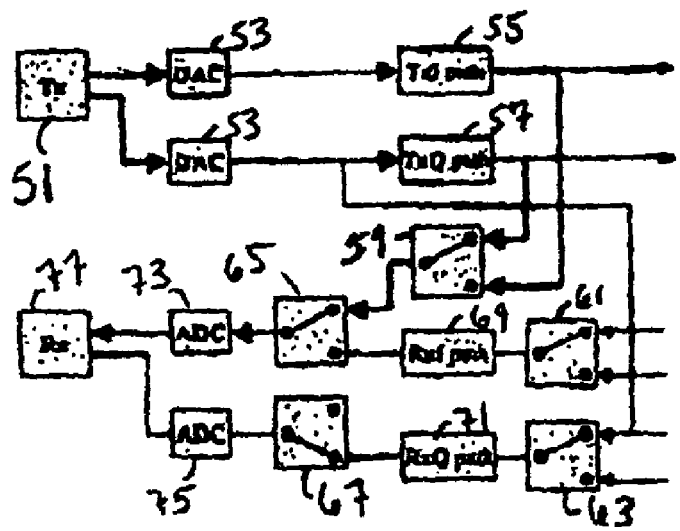
FIGS. 2 and 3 are block diagrams illustrating transmitter and receiver paths for IQ mismatch estimation in accordance with a preferred embodiment of the present invention.
Figure 3:
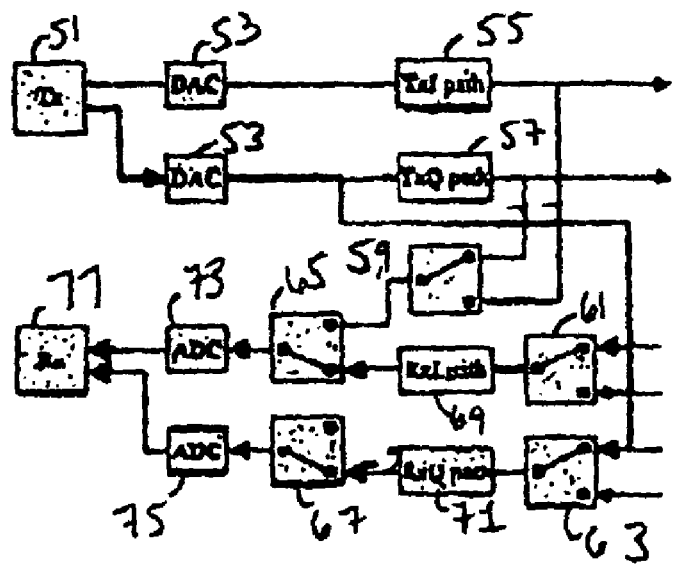

In accordance with the present invention, correction for nonidealities includes estimation of IQ path mismatch in the transmitter and receiver components by measuring transmitter IQ mismatch and receiver IQ mismatch, as described with reference to the block diagrams of transmitter and receiver paths illustrated in FIGS. 2 and 3. Common to both FIGS. 2 and 3 are a transmitter 51 that transmits signal data through DACs 53 for I and Q paths 55, 57. Control of switches 59, 61, 63, 65, and 67 direct the signals from the I and Q paths 55 and 57 to I and Q paths 69, 71, and through ADCs 73, 75, to a receiver 77. In general, by controlling the switches to the positions shown in FIG. 2, a loop back path results for measurement and estimation of the gain and phase response of the entire transmitter I and Q paths. Since the receiver path is shared in this configuration, the difference determined between the paths gives the transmitter IQ mismatch in a form of gain and phase response. Similarly, the switch positions shown by FIG. 3 allow for a loop back path for measurement and estimation of gain and phase response of the entire receiver I and Q paths. The ADCs 73, 75 converts the signals from the IQ paths 69, 71 just as is done in data reception. Since the signal source is shared, the difference determined between the paths gives the receiver IQ mismatch in a form of phase and gain response.

In performing the determination, the gain and phase measurement occurs by sending a tone signal and measuring the power and phase shift. While repetition of this sending and measuring process can be done for all of the frequency points needing to be measured, an efficient manner for gain and phase measurement occurs by sending uniformly spaced multi-tone white signals and taking a fast Fourier transform (FFT) of the unit period of the signals. Based on the power and phase of each tone, the response is calculated.

Calculation of the gain and phase response difference occurs as represented in the following:

$$H(\omega) = g(\omega) \cdot e^{j\Theta(\omega)}$$

which provides an expression of an LTI (linear time-invariant) system with a complex frequency response. Feeding of a signal A cos($\omega$t)+B sin($\omega$t) and receiving a signal X cos($\omega$t)+Y sin($\omega$t) provides a relationship:

$$R_{XY} e^{j\phi_{XY}} = X + Yj = g(\omega) \cdot e^{j\Theta(\omega)}(A + Bj) = g(\omega) \cdot e^{j\Theta(\omega)} R_{AB} e^{j\phi_{AB}}$$

By measuring the amplitude and phase of the received signal, the response can be calculated, where the gain and phase response difference results from $$g_{diff}(\omega) e^{j\Theta_{diff}(\omega)} = \frac{g_I(\omega)}{g_Q(\omega)} e^{j(\theta_I(\omega) - \theta_Q(\omega))}$$

Use of a periodical multi-tone white signal allows analysis to occur by taking a FFT corresponding to the unit period.

The task of compensation is to generate a counter filter to cancel the gain and phase response difference. An arbitral LTI system can be represented as a linear combination of the basis. A projection provides the linear coefficients for the basis. In turn, these linear coefficients give tap parameters of a counter FIR (finite impulse response) filter, where a set of FIR tap parameters, $$Hs_n(z) = \delta z^{-n} + \delta z^n$$

$$Ha_n(z) = -yz^{-n} + yz^n$$

form an orthogonal basis in the frequency domain. If the gain and phase response is not available for the entire frequency space of the sampling rate, the coefficients can be calculated based on least square criteria.

By way of example, for generation of the probing signal having multi-tone signals of uniform power, IFFT is used and the real part of the FFT output is taken, as demonstrated by the following equations using Matlab (_____) code:

```
tones=[1,1,-1,-1,1,1,-1,1,-1,1,1,1,1,1,1,-1,-1,1,1,-1,
   1,-1,1,1,1]
fftIn=zeros(1,FFT_LEN);
fftIn(2:length(tones)+1)=tones;
fftOut=ifft(fftIn);
cxSig(1:GUARD_LEN)=fftOut(FFT_LEN-
   GUARD_LEN+1:FFT_LEN);
cxSig(GUARD_LEN+1:GUARD_LEN+FFT_LEN)
   =fftOut;
cxSig(GUARD_LEN+FFT_LEN+1:2*GUARD_LEN+
   FFT_LEN)=fftOut(1:G sig=real(cxSig);
   Ga
``` in and phase response calculation (filtChar) occurs based on the measured I and Q signals (measSigI(1:FFT_LEN), measSigQ(1:FFT_LEN)) and the gain and phase response difference, where:

```
fftTmp=FFT(measSigI);
fftI=fftTmp(2:TONE_NUM+1);
fftTmp=FFT(measSigQ);
fftQ=fftTmp(2:TONE_NUM+1);
filtChar=fftI./fftQ;
```

The symmetric and asymmetric taps in the FIR tap parameters form the following orthogonal basis in the frequency domain

```
cos Basis(n)=cos((n-1)*2*pi*(1:TONE_NUM)/
   FFT_LEN);
sin Basis(n)=sin(n*2*pi*(1:TONE_NUM)/FFT_LEN);
```

Taking the inner product of the gain and phase response difference, projection coefficients are calculated, where

```
prj Cos(n)=real(filtChar)⊗ cos Basis(n);
prj Sin(n)=imag(filtChar)⊗ cos Basis(n);
```

In the case that the probing tone spans the entire frequency space of the sampling rate, these projection coefficients give the tap parameter coefficients δ(n) and γ(n). Otherwise, the projection coefficients need to be weighted by a matrix that is derived by the least square criteria. The definition of the weighting matrix, InvFC and InvFS for projection coefficients, prj Cos(n) and prj Sin(n), respectively, are given as:

```
FC(m,n)=cos Basis(m)⊗ cos Basis(n);
InvFC=inv(FC);
FS(m,n)=sin Basis(m)⊗ sin Basis(n);
InvFS=inv(FS);
```

Using this matrix, the coefficients are calculated based on

```
δ(n)=InvFC⊗ prj Cos;
γ(n)=InvFS⊗ prj Sin;
```

Finally, the compensation filter, F(z), is calculated as:

```
cntTaps(PRJ_DIM+1)=prj Cos(1);
for(I=1:PRJ_DIM)
   cntTaps(PRJ_DIM-I+1)=(prj Cos(I+1)+prj Sin(I))/2;
   cntTaps(PRJ_DIM+I+1)=(prj Cos(I+1)-prj Sin(I))/2;
end
```

When a FIR filter is already being used for low pass filtering, then one of the filter tap parameters can be adjusted by convolving with the compensation tap parameters. Following is an example for a case that adjusts Q filter tap parameters. Assuming the Q low pass FIR filter tap is firTapsQ the low pass filtering can compensate the mismatch by updating the tap parameters as shown below.

```
tmpTaps=conv(cntTaps,firTapsQ);
firTapsQ=tmpTaps(PRJ_DIM+1:PRJ_DIM+FIR_LEN);
```

Through the present invention, estimation of the difference of the IQ paths in a form of a gain and phase response occurs with compensation of only the difference of the IQ paths using digital FIR filter, which may be used for some other purposes such as pulse shaping or filtering. It further provides estimation for the tap parameters and uses projection to an orthogonal or nearly orthogonal basis in a way of least square criteria. Averaging of measured signal improves the SNR (signal-to-noise ratio). Linear approximation for the gain and phase response difference calculation is used and with the differences being small, taking the real part and imaginary part of complex response gives good approximation. Iterative estimation is used for the compensation filter taps parameters by using a pre-compensated signal based on the previous measurements and only working on the residual difference. Thus, even for fairy large difference, the present invention can eventually acquire the correct compensation taps parameters for the FIR filter. Post-compensation based iterative estimation by using the latest compensation taps parameters occurs that deals only with the residual, which can be assumed to be small. By iteratively applying a sequence of the post-compensation, estimation, and update of compensation taps parameters as a whole, the present invention can estimate a rather large mismatch of I and Q filters.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for measuring IQ path mismatch in transceivers, the method comprising:
   estimating a transmitter IQ mismatch in a form of gain and phase response for transmitter in-phase (I) and quadrature (Q) paths sharing a receiver path; and
   estimating a receiver IQ mismatch in a form of gain and phase response for receiver I and Q paths sharing a signal source,
   wherein the estimating of the transmitter IQ mismatch comprises measuring a difference in the gain and phase response between the transmitter I and Q paths, and the estimating of the receiver IQ mismatch comprises measuring a difference in the gain and phase response between the receiver I and Q paths.

2. The method of claim 1, wherein the measuring comprises sending a tone signal and measuring a power and phase shift for all of desired frequency points.

3. The method of claim 2, wherein the measuring comprises sending uniformly spaced multi-tone white signals, taking a fast Fourier transform (FFT) of a unit period of the uniformly spaced multi-tone white signals, and calculating the response from a power and phase of each tone.

4. The method of claim 1, comprising compensating for the difference of the transmitter and receiver I and Q paths using a digital FIR filter.

5. The method of claim 4, comprising utilizing iterative estimation for filter tap parameters during the compensating.

6. A system for estimation of IQ path mismatch during signal modulation, the system comprising
   a transceiver, the transceiver comprising a transmitter and a receiver; and
   a processor coupled to the transceiver, the processor identifying a transmitter IQ mismatch in a form of gain and phase response for transmitter in-phase (I) and quadrature (Q) paths sharing a receiver path, and identifying a receiver IQ mismatch in a form of gain and phase response for receiver I and Q paths sharing a signal source, wherein the estimating of the transmitter IQ mismatch comprises measuring a difference in the gain and phase response between the transmitter I and Q paths, and the estimating of the receiver IQ mismatch comprises measuring a difference in the gain and phase response between the receiver I and Q paths.

7. The system of claim 6, wherein the processor sends a tone signal and measures a power and phase shift for all of desired frequency points.

8. The system of claim 7, wherein the processor sends uniformly spaced multi-tone white signals, taking a fast Fourier transform (FFT) of a unit period of the uniformly spaced multi-tone white signals, and calculating the response from a power and phase of each tone.

9. The system of claim 6, comprising a digital FIR filter coupled to the transmitter and receiver paths that compensates for the difference of the transmitter and receiver I and Q paths.

10. The system of claim 9, wherein the processor utilizes iterative estimation for filter tap parameters during the compensating.

11. A method for estimating IQ path mismatch in a transceiver, the method comprising:
  measuring a difference in the gain and phase response between transmitter in-phase (I) and quadrature (Q) paths and between receiver I and Q paths of a transceiver, the transmitter I and Q paths sharing a receiver path and the receiver I and Q paths sharing a signal source; and
  compensating for the difference of the transmitter and receiver I and Q paths using a digital FIR filter.

12. The method of claim 11, wherein the measuring comprises sending a tone signal and measuring a power and phase shift for all of desired frequency points.

13. The method of claim 12, wherein the measuring comprises sending uniformly spaced multi-tone white signals, taking a fast Fourier transform (FFT) of a unit period of the uniformly spaced multi-tone white signals, and calculating the response from a power and phase of each tone.

14. The method of claim 13, wherein the compensating comprises utilizing iterative estimation for filter tap parameters.

15. The method of claim 14, comprising performing the measuring and compensating for spectrum efficient modulation.

16. A system for estimation of IQ path mismatch during signal modulation, the system comprising
  a processor operatively coupled to a transceiver comprising a transmitter and a receiver, the processor identifying a transmitter IQ mismatch in a form of gain and phase response for transmitter in-phase (I) and quadrature (Q) paths sharing a receiver path, and identifying a receiver IQ mismatch in a form of gain and phase response for receiver I and Q paths sharing a signal source,
  wherein the estimating of the transmitter IQ mismatch comprises measuring a difference in the gain and phase response between the transmitter I and Q paths, and the estimating of the receiver IQ mismatch comprises measuring a difference in the gain and phase response between the receiver I and Q paths.

17. The system of claim 16, wherein the processor sends a tone signal and measures a power and phase shift for all of desired frequency points.

18. The system of claim 17, wherein the processor sends uniformly spaced multi-tone white signals, taking a fast Fourier transform (FFT) of a unit period of the uniformly spaced multi-tone white signals, and calculating the response from a power and phase of each tone.

19. The system of claim 16, comprising a digital FIR filter coupled to the transmitter and receiver paths that compensates for the difference of the transmitter and receiver I and Q paths.

20. The system of claim 19, wherein the processor utilizes iterative estimation for filter tap parameters during the compensating.

* * * * *